Sept. 14, 1954     A. E. KITTREDGE     2,689,018
APPARATUS AND METHOD FOR DEAERATING WATER
Filed June 11, 1951     3 Sheets-Sheet 1
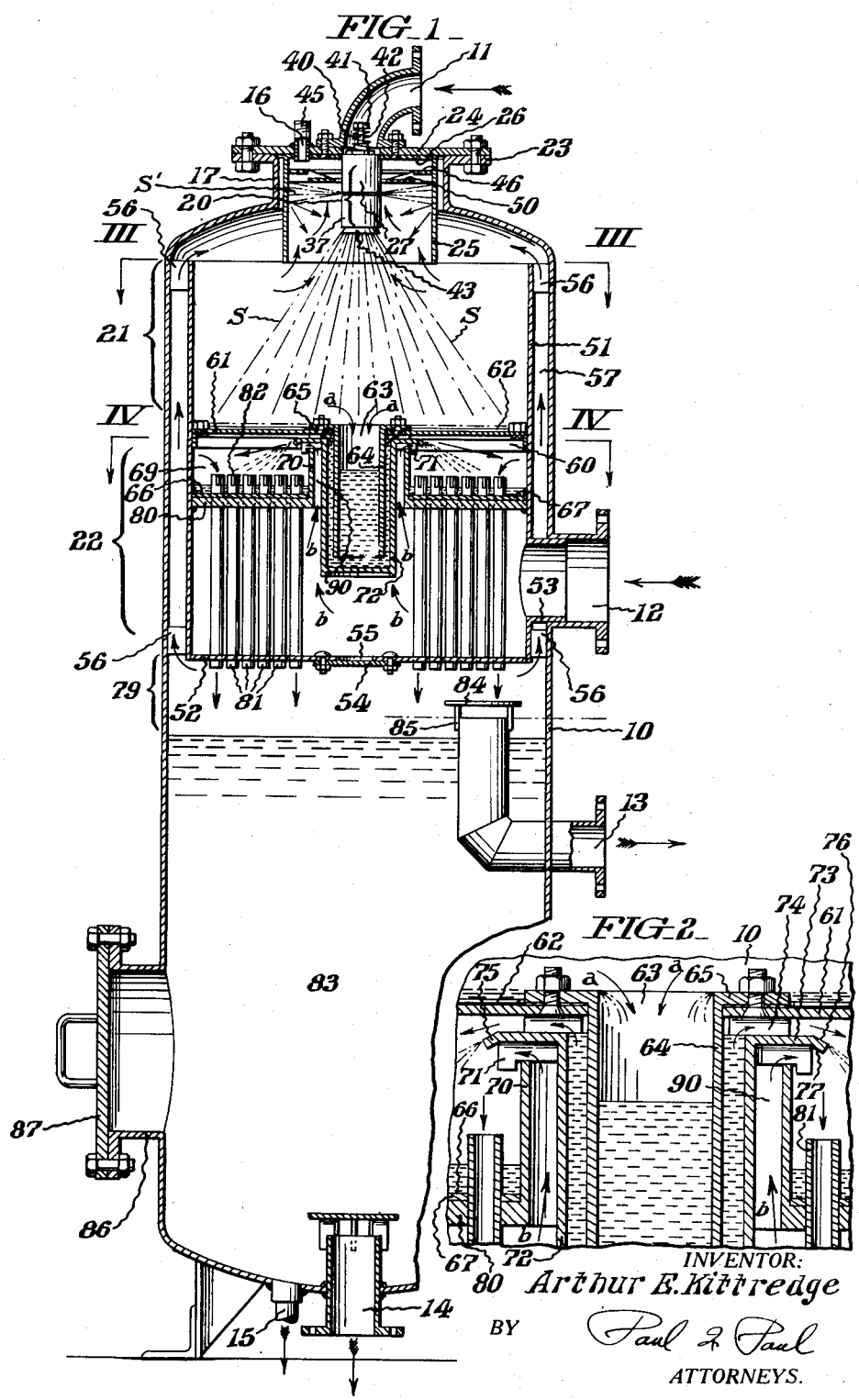
INVENTOR:
Arthur E. Kittredge
BY Paul & Paul
ATTORNEYS.

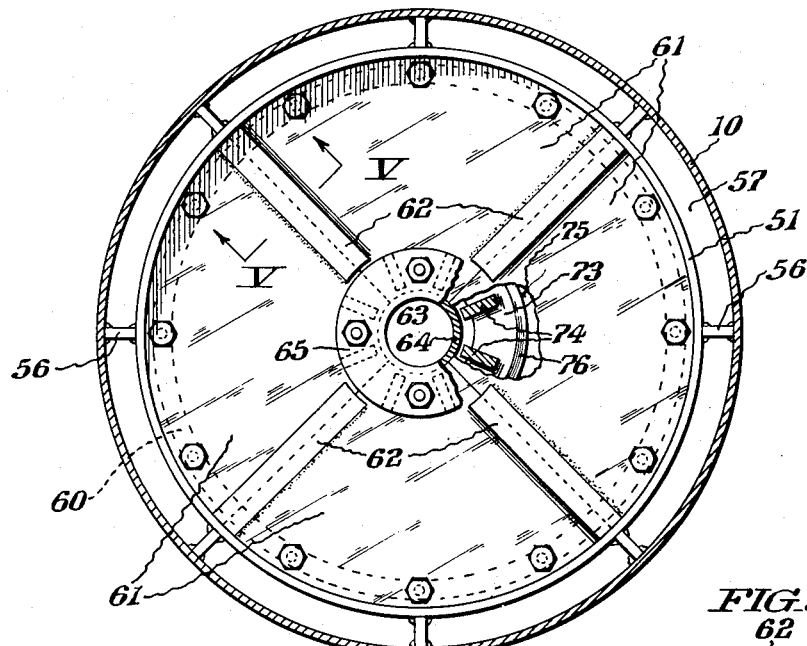
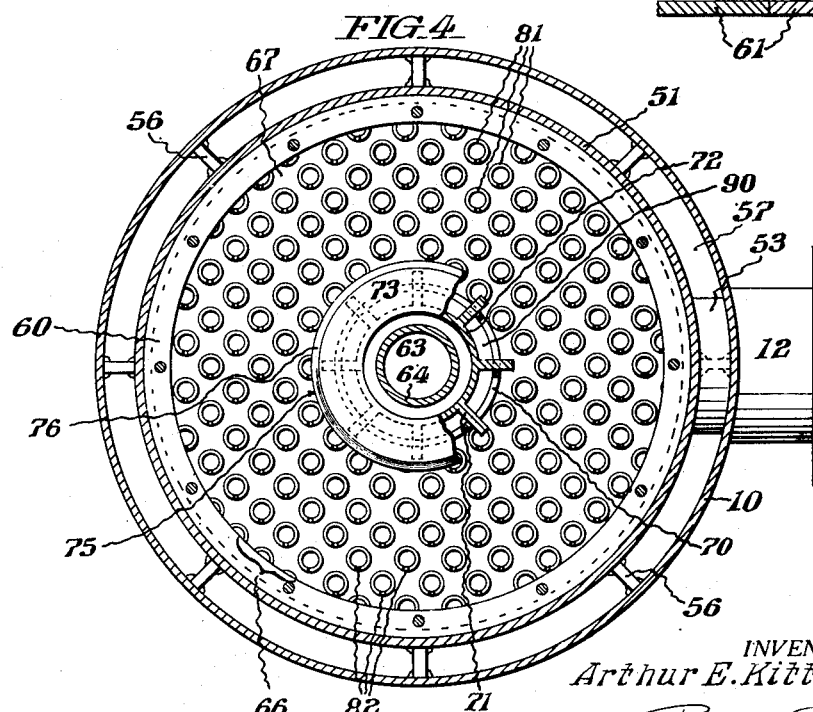

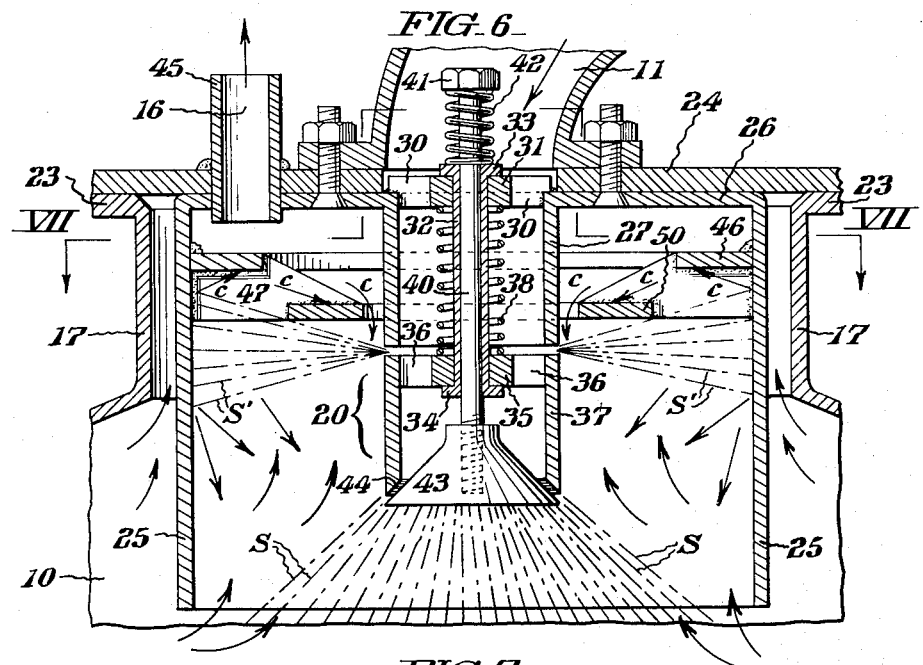
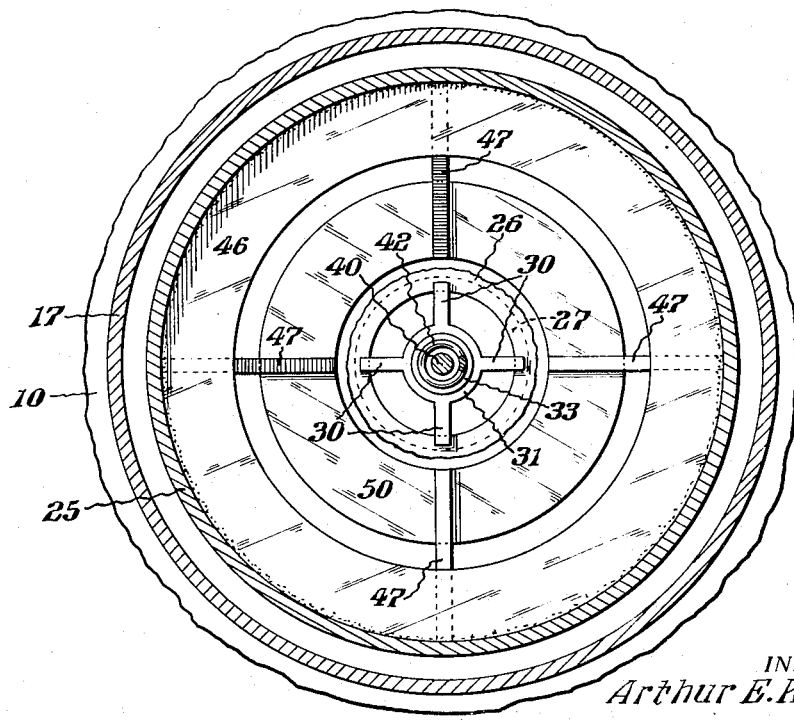

Patented Sept. 14, 1954

2,689,018

UNITED STATES PATENT OFFICE 2,689,018

APPARATUS AND METHOD FOR DEAERATING WATER

Arthur E. Kittredge, Audubon, N. J., assignor to American Water Softener Co., Philadelphia, Pa., a corporation of New Jersey Application June 11, 1951, Serial No. 230,951

11 Claims. (Cl. 183—2.5)

This invention relates to apparatus and method for deaerating water, and more particularly for preheating and deaerating water.

It has previously been proposed to provide a water deaerator wherein the air and other relatively noncondensible gases are separated from the water by the direct contact scrubbing action of steam. In certain instances the steam remaining after completion of the scrubbing or deaerating process is separated from the deaerated water and recycled for countercurrent direct contact with the water entering the apparatus, thereby utilizing the heat of the recovered steam to preheat the water. One example of such apparatus is shown in my prior U. S. Patent No. 1,951,024, issued March 13, 1934. Another device of somewhat similar character is disclosed in the U. S. patent to Gibson et al. No. 1,951,015, issued March 13, 1934.

In conventional water deaerating devices, great emphasis has been placed upon the feature wherein a tortuous path is provided for the steam and water in the deaerating section of the apparatus, such construction being generally accepted as superior from the standpoint of deaerating efficiency. However apparatus of this character is subject to the objection that a relatively high pressure drop is encountered by reason of the fluid flow through the tortuous passages. Moreover the prior art devices have been relatively expensive to manufacture and the tortuous passage elements difficult to maintain.

In deaerating apparatus having a preliminary preheating chamber for preheating the incoming water, it is conventional to provide a water seal between the preheating section and the deaerating section of the apparatus. Because of the relatively great pressure drop of the steam passing through the deaerating stage, it has been necessary to provide a relatively deep water seal to overcome the pressure loss imposed upon the steam before it reaches the preheating compartment.

Still another difficulty encountered is that the water heating and deaerating apparatus of the prior art has a limited capacity in proportion to its size and is relatively expensive to manufacture, operate and maintain.

It is accordingly an object of the invention to provide an improved apparatus and method for deaerating water. Another object of the invention is to provide a relatively compact apparatus characterized by improved efficiency and capacity for deaerating water. Still another object is to provide an efficient, high capacity method for deaerating water with steam and preheating the water to be deaerated by transferring heat to it from the steam recovered from the deaeration process. Other objects are to provide method and means for minimizing or overcoming the effect of pressure drop as the steam passes through the deaeration stage of the process, and for providing means for transferring heat from the vent steam to the incoming water. Other objects and advantages of the invention including the simplicity, economy, and ease of operation and maintenance in accordance with the invention will further be apparent hereinafter, and in the drawings whereof:

Fig. 1 represents a side elevation of water deaerating apparatus constituting one embodiment of the invention.

Fig. 2 represents an enlarged fragmentary side elevation of the central portion of the apparatus of Fig. 1.

Figs. 3 and 4 represent sectional views taken as indicated by the lines and arrows III—III and IV—IV which appear in Fig. 1.

Fig. 5 represents a sectional view taken as indicated by the lines and arrows V—V which appear in Fig. 3.

Fig. 6 represents an enlarged fragmentary side elevation of the upper portion of the apparatus of Fig. 1, and Fig. 7 represents a sectional view taken as indicated by the lines and arrows VII—VII which appear in Fig. 6.

It will be appreciated that the foregoing drawings and the following description relate to one specific embodiment of the invention, and that numerous modifications may be made without departing from the scope of the invention.

Referring now to the deaerating heater construction shown in the drawings, the number 10 designates a tank having a water inlet pipe 11 at its top, steam inlet pipe 12 and water overflow pipe 13 on its side, deaerated water outlet pipe 14 and drain line 15 on its bottom, and a vent 16 for the relatively non-condensible gases, principally air. Mounted in a neck 17 at the top of tank 10 is a nozzle structure comprehensively designated 20 serving to introduce the water in the form of a spray into a water preheating section 21 of the tank 10. Below the water preheating section 21 is a deaerating section 22, further to be described in detail.

Bolted to the flange 23 of neck 17 is a cover plate 24 having a central aperture in registry with the opening in the water inlet pipe 11, which is bolted to the top of cover plate 24. A cylindrical plate 25, concentric with tank 10, see particularly Figs. 1, 6, 7, is formed integrally with a top plate 26 which is bolted to cover plate 24 and to water inlet pipe 11. A depending tube 27 is formed integrally with top plate 26 in alignment with the opening in water inlet pipe 11, the top plate 26 having an aligned central opening to provide free communication between pipe 11 and depending tube 27.

Supported on and welded to the top plate 26 and depending tube 27 are four upper wings 30 formed integrally with an upper ring 31 through which is disposed a vertical sleeve 32 having a top flange 33 overlapping the top face of ring 31, and thus supported by ring 31. The vertical sleeve 32 also has a bottom flange 34 supporting a lower ring 35 to which are affixed four lower wings 36. Wings 36 are affixed to a depending cylinder 37 which is concentric with, and has substantially the same diameter as, the depending tube 27. A helical spring 38 normally under compression, surrounds the sleeve 32 and bears against rings 31 and 35. A vertical shaft 40 is slidably disposed within the sleeve 32 for movement up and down, and has a fixed nut 41 at its upper end upon which the helical spring 42, normally under compression, bears. Spring 42, at its lower end, bears upon the top face of sleeve 32, and normally urges the shaft 40 upwardly. It is stronger than the spring 38. Threaded to the lower end of shaft 40 is a substantially conical valve member 43 coacting with the inclined valve seat 44 formed on the bottom face of depending cylinder 37.

Spring 42 normally overcomes spring 38, moving shaft 40 upwardly to its limit position wherein the valve 43 is closed and the cylinder 37 is in contact with the depending tube 27. However water under pressure introduced through water inlet pipe 11 is effective upon valve 43 to move the vertical shaft 40 downwardly together with valve 43 and cylinder 37 providing a substantially horizontally directed fanned vent condenser spray S' extending in all directions completely across the area enclosed within the annular plate 25, in the region of the neck 17 of tank 10. After cylinder 37 reaches mechanical stop shoulder 34, the valve 43 is opened, providing a conical water spray S which is directed downwardly in the deaerating section 21 of tank 10.

The cover plate 24 and top plate 26 have aligned apertures forming a vent 16 accommodating a vent pipe 45 through which air and other noncompressible gases are vented to the atmosphere. Vent pipe 45 is welded to cover plate 24.

An outer baffle ring 46 is welded to the inner surface of annular plate 25 and four web strips 47 are welded to the same inner surface and to the baffle ring 46. An inner baffle ring 50, of less diameter than outer baffle ring 46, and disposed below it, is welded to each of the web strips 47 and supported thereby, at a point slightly above the bottom end of the depending tube 27. The baffle rings 46, 50 are thus disposed intermediate the spray S' and vent pipe 45 and serve to keep the spray S' from entering the vent pipe 45.

Referring now more particularly to Figs. 1–5 of the drawings, the number 51 designates an upright cylindrical receptacle concentric with tank 10, having a bottom plate 52 below the steam inlet pipe 12, and an inlet conduit 53 sealed within the steam pipe 12. Bottom plate 52 carries a gasketed handhole cover 54 for the handhole 55. The receptacle 51 is supported within the walls of tank 10 by the upper and lower spacer strips 56. Thus there is provided an annular space 57 between the receptacle 51 and tank 10. The cylindrical side wall of receptacle 51 terminates at its upper end at substantially the same level as the bottom edge of the cylindrical plate 25.

A shelf ring 60 is affixed to the inside face of receptacle 51 below the deaerating section 21. A plurality of separate shelf plates 61 are bolted to the shelf ring 60, with sealing gaskets therebetween, each shelf plate 61 having a raised strip 62 fixed to it and overlapping the next adjacent shelf plate 61 of the group. A yieldable gasket 59 (Fig. 5) is compressed between each raised strip 62 and the shelf plate 61 beneath it, forming water-tight seals between the individual shelf plates 61. The shelf plates 61 have a central opening 63 within which is inserted an inside water pipe 64 having top flanges 65 bolted to the shelf plates 61, with gaskets interposed to form a seal. A distributor tray 66 having a relatively heavy horizontal plate 67 and upright cylindrical inner wall 70 is affixed to the inside face of receptacle 51 below the shelf plates 61, thus forming an annular chamber 69 in the receptacle 51. Supported on top of the wall 70 by means of hangers 71 is a water receptacle 72 having a closed bottom below the bottom edge of inside water pipe 64, but open at the top. The water seal receptacle 72 has a top flange 73 spaced immediately below the shelf plates 61 by spacer webs 74 which also constitute support members for the shelf plates 61 and the inside water pipe 64. Top flange 73 has an integral extension flange 75 which has downwardly and outwardly inclined top and bottom faces 76, 77.

The horizontal plate 67 of the distributor tray 66 has a stiffener plate 80 immediately below it, and the plates 67, 80 are provided with apertures accommodating a plurality of heat exchangers in the form of vertical wetted-wall tubes 81. Tubes 81 are also disposed through corresponding apertures in the bottom plate 52 of receptacle 51. The tubes 81 have narrow vertical notches 82 all at substantially the same level above the stiffener plate 80, in the form of weirs through which the water flows into the tubes 81 from distributor tray 66.

The bottom portion 83 of tank 10 constitutes a water storage section with a separation chamber 79 above the water level in the chamber 83. Overflow pipe 13 supports a cap 84, spaced directly above the opening of pipe 13 by bars 85. Cap 84 serves as a shield deflecting the combined water and steam from tubes 81 preventing them from entering the overflow pipe 13. A large pipe 86 with sealed cover 87 is provided for access of personnel to the water storage chamber 83.

From the foregoing the operation of the apparatus will be apparent. Water entering through pipe 11 bears upon the valve 43, moving it downwardly and permitting cylinder 37 to slide downwardly, away from depending tube 27, thus first providing the spray S'. Further application of water pressure drives valve 43 further downwardly, away from cylinder 37 which is then supported by flange 34, thus forming spray S. The spray S' is collected on the annular plate 25 and drops vertically from it, intersecting the path of main water spray S and mixing with it. The mixed water is collected on the shelf formed by shelf plates 61 and overflows, as indicated by the arrows (a), into the central opening 63 in pipe 64. This water is collected in water seal receptacle 72 and flows over the flange 73 and the top face 76 of flange 75, eventually dropping to the distributor tray 66, overflowing the weirs formed by notches 82, and downwardly within the tubes 81 to the deaerated water storage chamber 83.

Steam entering through pipe 12 flows transversely across the vertical tubes and upwardly as indicated by the arrows (b) through the narrow annular space 90 between the upright cylindrical inner wall 70 and the wall of water receptacle 72. At the top of the annular space 90 the steam turns sharply outwardly by reason of flange 73. The steam emerging from the circular radial discharge port entrains fluid from the outlet of the water seal. The steam jet creates a suction effect on the outlet of the water seal. The mixed water and steam flow under violently turbulent conditions downwardly through tubes 81 with further direct heat interchange and removal of air and other gases from the water, and the steam and gases separate from the water which settles in separation chamber 79. The steam and air flow upwardly through the annular space 57, into the neck portion of the tank. Some of the steam flows at an angle through the water spray S, preheating the water. The entrained air and other gases travel with the steam upwardly inside the annular plate 25 and through the vent condenser spray S' in which some of the remaining steam is condensed.

It is of particular importance to observe that the jet action of the steam, in combination with the condensing action of the water on the steam at the edge of extension flange 75 creates a slight suction on the water seal outlet. While in conventional deaerating heaters a water seal of about 18 inches head and above has been required, the apparatus may be so designed that, for particular water and steam flow rates, a relatively low pressure differential is effective upon the water seal.

The particular construction embodying the wetted wall tubes 81 is highly advantageous, in that means are provided wherein the preheated water is deaerated by intimate contact with steam under conditions of high turbulence on both the steam and water inside the tubes, while concurrently heat is transferred through the tube walls to bring the water being deaerated closer to the boiling point, or even under certain conditions to cause actual evaporation within the tubes.

The particular construction of the apparatus is also of real advantage. The relatively heavy horizontal plate 67, coacting with stiffener plate 80, serves not only as a sealed trough for water distribution, but also as a support for the water seal receptacle 72. Moreover the vertically disposed tubes 81, together with bottom plate 52 of cylindrical receptacle 51 further coact with the foregoing elements to provide structurally rigid support means for the shelf plates 61 as well as the inside water pipe 64 and water seal receptacle 72, eliminating the weight and expense of additional structural support members, and providing substantially unobstructed free space in the deaerating section 21, and above the distributor trough 66. Moreover, by reason of this construction the apparatus may readily be wholly or partially dismantled for cleaning, repair or replacement of parts.

While I have disclosed my invention with reference to one embodiment thereof, it will be apparent to those skilled in the art that changes may be made in the form of the apparatus specifically described herein, including reversals of parts and substitutions of equivalent mechanisms, and that certain features of the invention may be used to advantage without the use of other features, all without departing from the spirit of the invention as defined in the annexed claims.

Having thus described the invention, I claim:

1. In apparatus for deaerating water, a tank, means for introducing water into said tank, means including a water seal through which said water flows, said water seal having a restricted outlet including a downwardly inclined flange supporting the water flowing out of said seal, a mixing chamber in said tank arranged to receive the water from said inclined flange member, vertical tubes connected to said mixing chamber and extending downwardly therefrom, a steam chamber through which the tubes pass, a separation chamber below said steam chamber said separation chamber being connected to said tubes, means for introducing steam into said steam chamber, and means providing a restricted passage disposed between said water seal and mixing chamber connecting said steam chamber to said mixing chamber at a point immediately below said downwardly inclined flange.

2. Apparatus for deaerating water comprising a water preheating chamber, a mixing chamber, a vent on said preheating chamber, a water spray nozzle in said preheating chamber comprising a pair of coaxial cylinders movable toward and away from one another to form a slot below said vent means, means for introducing water under pressure to one of said cylinders to form a spray through said slot, limit means governing the extent of movement of said cylinders away from one another, means on one of said coaxial cylinders coacting with said limit means to provide a second water spray directed into said preheating chamber, means for conducting the sprayed water into said mixing chamber, means for introducing steam into the mixing chamber to deaerate said water, walls forming a separate space below said mixing chamber for separating the steam and air from said deaerated water, and a conduit carrying said separated steam into said preheating chamber for passage through both said sprays.

3. The invention defined in claim 2, further characterized by the provision of baffle plates between the vent means and the slot between said coaxial cylinders.

4. The invention defined in claim 2, further characterized by the provision of an annular wall disposed outside said nozzle, inside the wall of the preheating chamber and in the path of the spray emanating from said slot, said annular wall forming an annular space communicating with said preheating chamber, whereby the steam in said preheating chamber forms an annular steam wall for heating indirectly the water sprayed through said slot.

5. Apparatus for deaerating water comprising a tank having a preheating chamber, means for introducing water into said preheating chamber, a water collecting plate affixed to the tank walls inside the tank, a pipe suspended from said water collecting plate in communication with said preheating chamber, a distributing tray affixed to the tank walls inside the tank below said water collecting plate, support means including a water container within which said pipe is received, said support means being carried by said distributing tray for supporting said water collecting plate above said distributing tray, a conduit for transporting water from said water container to said distributing tray, a plurality of vertical tubes connected to receive said water from said distributing tray, means for introducing steam adjacent said conduit for ultimate flow with the water through said vertical tubes, and means for recycling excess steam from said tubes to said preheating chamber.

6. Apparatus for deaerating water comprising a tank having a preheating chamber, means for introducing water into said preheating chamber, a water collecting plate affixed to the tank walls inside the tank, a pipe suspended from said water collecting plate in communication with said preheating chamber, a distributing tray affixed to the tank walls inside the tank below said water collecting plate, support means including a water container within which said pipe is received for supporting said water collecting plate from said distributing tray, a conduit for transporting water from said container to said distributing tray, a deaerator in the form of a plurality of rigid tubes connected to said distributing tray for receiving said water, a plate spaced below said distributing tray fixed to the walls of said tank and having apertures through which said rigid tubes extend, a conductor extending into the tank and communicating with said rigid tubes, for introducing steam along with the water into said rigid tubes, and means for recycling excess steam from said tubes to said preheating chamber.

7. The invention defined in claim 6, further characterized by the fact that the rigid tubes terminate above the bottom of the distributing tray and are slotted to provide weirs at substantially a common level controlling the flow of water from the distributing tray into the rigid tubes.

8. An apparatus for deaerating water comprising an upper chamber, means for introducing said water into said upper chamber, a lower chamber, a plurality of heat exchanger conductors having openings communicating with the upper chamber, said heat exchanger conductors having exposed surfaces extending down into the lower chamber, means for introducing steam into the lower chamber in direct contact with the exposed surfaces of said heat exchanger conductors, conduit means leading from said lower chamber to said upper chamber for conducting the steam into the upper chamber, means for mixing said water and steam, and means for conducting said steam mixed with the water downwardly through the heat exchanger.

9. In apparatus for deaerating water, an upper chamber, means for introducing water in a given direction into said upper chamber, jet means for introducing steam at high velocity immediately adjacent and into said water in substantially said direction, heat exchange means below the upper chamber connected to said upper chamber, whereby the contents of the mixing chamber are conducted downwardly through said heat exchange means, a steam chamber in which the outer surface of the heat exchange means is located, means for introducing steam into said steam chamber, said steam being in direct contact with said outer surface, and means connecting said steam chamber to said jet means.

10. The method of deaerating water in a heat exchanger comprising passing steam continuously through one side of said heat exchanger, continuously removing said steam from said heat exchanger, continuously mixing said removed steam with the water to be deaerated, and causing the resulting mixture to flow continuously downwardly with turbulence through the other side of said heat exchanger to effect deaeration of said water in said heat exchanger, and maintaining the incoming steam at a higher temperature than said mixture.

11. The method of deaerating water in a heat exchanger comprising passing steam continuously through one side of said heat exchanger, continuously removing said steam from said heat exchanger, continuously mixing said removed steam with the water to be deaerated, and causing the resulting mixture to flow continuously downwardly with turbulence through the other side of said heat exchanger to effect deaeration of said water in said heat exchanger, separating said water from the mixed steam and air, and venting said air to atmosphere.

References Cited in the file of this patent

UNITED STATES PATENTS

| Number | Name | Date |
|---|---|---|
| 1,883,379 | Kerman | Oct. 18, 1932 |
| 2,078,288 | Sherman | Apr. 27, 1937 |
| 2,308,719 | Sebald et al. | Jan. 19, 1943 |
| 2,308,720 | Sebald | Jan. 19, 1943 |
| 2,580,791 | Kahn | Jan. 1, 1952 |